US012167223B2

(12) United States Patent
Togami et al.

(10) Patent No.: US 12,167,223 B2
(45) Date of Patent: Dec. 10, 2024

(54) REAL-TIME LOW-COMPLEXITY STEREO SPEECH ENHANCEMENT WITH SPATIAL CUE PRESERVATION

(71) Applicant: Amazon Technologies, Inc., Seattle, WA (US)

(72) Inventors: Masahito Togami, San Jose, CA (US); Karim Helwani, Mountain View, CA (US); Jean-Marc Valin, Montreal (CA); Michael Mark Goodwin, Scotts Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 17/810,303

(22) Filed: Jun. 30, 2022

(65) Prior Publication Data

US 2024/0007817 A1 Jan. 4, 2024

(51) Int. Cl.

*H04S 7/00* (2006.01)
*G10L 21/0216* (2013.01)
*H04S 1/00* (2006.01)

(52) U.S. Cl.

CPC .......... *H04S 7/303* (2013.01); *G10L 21/0216* (2013.01); *H04S 1/007* (2013.01); *H04S 2400/03* (2013.01); *H04S 2400/11* (2013.01); *H04S 2400/15* (2013.01)

(58) Field of Classification Search

CPC ...... H04S 7/303; H04S 1/007; H04S 2400/03; H04S 2400/11; H04S 2400/15; G10L 21/0216

See application file for complete search history.

(56) References Cited

U.S. PATENT DOCUMENTS 6,002,775 A 12/1999 Wood et al.
8,073,144 B2 12/2011 Henn et al.
2008/0031462 A1 2/2008 Walsh
2009/0304203 A1* 12/2009 Haykin ................ H04R 25/407 381/94.1
2019/0387346 A1 12/2019 De Burgh
2022/0406326 A1* 12/2022 Port ......................... H04R 3/02

OTHER PUBLICATIONS

International Search Report and Written Opinion mailed Sep. 4, 2023 in PCT/US2023/069049, Amazon Technologies, Inc., pp. 1-10.

Bahareh Tolooshams et al., "A Training Framework for Stereo-Aware Speech Enhancement Using Deep Neural Networks", 2022 IEEE International Conference on Acoustics, Speech and Signal Processing (ICASSP), May 23, 2022, pp. 6962-6966, IEEE.

* cited by examiner

*Primary Examiner* — Bhavesh M Mehta
*Assistant Examiner* — Darioush Agahi
(74) *Attorney, Agent, or Firm* — S. Scott Foster; Kowert, Hood, Munyon, Rankin & Goetzel, P.C.

(57) ABSTRACT

Real-time low-complexity stereo speech enhancement with spatial cue preservation may be performed. A stereo speech enhancement system receives a stereo input signal (e.g., a left and right input signal). The stereo speech enhancement system estimates spatial cues for a target speaker and downmixes the stereo input signal into a monaural signal. A low-complexity model may then process the monaural signal to generate an enhanced monaural signal. The stereo speech enhancement system upmixes the enhanced monaural signal based on the estimated spatial cues for the target speaker, to generate an enhanced stereo output signal.

20 Claims, 12 Drawing Sheets

REAL-TIME LOW-COMPLEXITY STEREO SPEECH ENHANCEMENT WITH SPATIAL CUE PRESERVATION

BACKGROUND

Over the past few years, audio enhancement methods (e.g., for recorded human speech) based on deep learning have greatly surpassed traditional methods (e.g., due to techniques such as spectral subtraction and spectral estimation). Audio enhancement methods may be used in a variety of applications. For example, a teleconferencing system may be used in a noisy and reverberant environment, so speech enhancement techniques may be needed to ensure clear communication.

By using multiple microphones for a teleconference, spatial aspects of sound may be captured, such as the locations of speakers or other sound sources. It may be useful to pursue high speech enhancement performance while at the same time preserving spatial cues because spatial cue information may help a listener to determine who is speaking during a teleconference. However, the large maintenance and training cost to implement a stereo-specific speech enhancement model (e.g., a deep neural network (DNN) model) can become prohibitive. Furthermore, applying a single-channel noise suppressor independently to each microphone signal may not preserve the spatial location of the speech and may also result in audible artifacts, particularly if the spatial properties of the target speech and the interfering noise are different.

Figure 1:
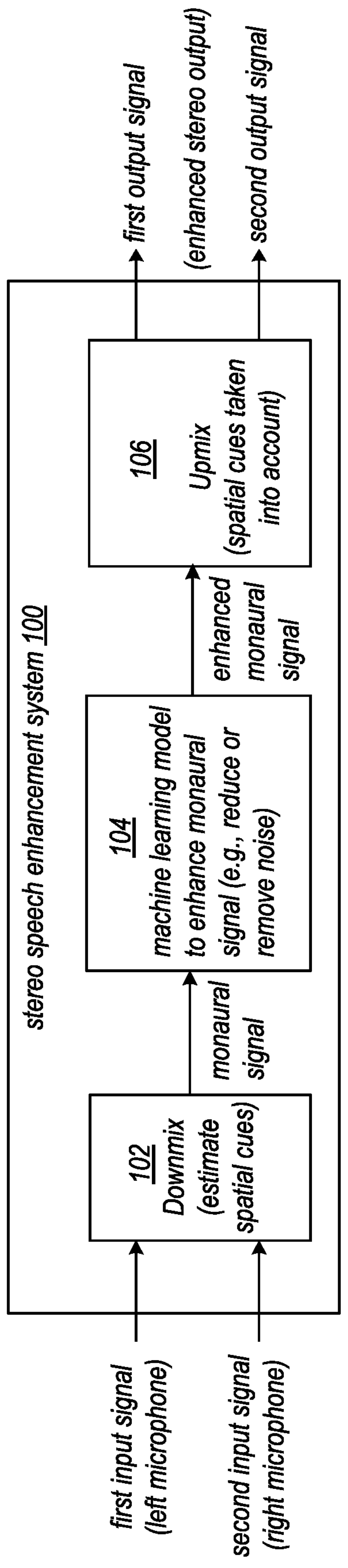
FIG. 1 illustrates a logical block diagram for real-time low-complexity stereo speech enhancement with spatial cue preservation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for real-time low-complexity stereo speech enhancement with spatial cue preservation are described herein. With the ubiquitous presence of real-time audio communication systems, there has been a significant interest in speech enhancement algorithms that operate in real-time with low complexity. Users (e.g., a target speaker) of these communication systems may find themselves in the presence of competing background sounds (e.g., noise from various sources). In various embodiments, any number of microphones may be used during a teleconference, resulting in multiple input signals. For example, two microphones may be used to provide a stereo input.

Implementing a stereo-specific speech enhancement model (e.g., a highly complex deep neural network (DNN) or other type of model) can become prohibitive. Instead, various embodiments may use a low-complexity model and/or algorithm, such as the example "PercepNet" model discussed herein, to deliver high-quality speech enhancement in real-time. As discussed in more detail below, in order to leverage such a model, the stereo input is downmixed to a monaural signal (while also estimating spatial cues, e.g., a steering vector and/or interaural phase/level differences between the different inputs), processed by the model, and then upmixed to produce an enhanced stereo signal (taking into account the spatial cues).

In various embodiments, machine learning (ML) model-based audio enhancement techniques that provide a perceptually motivated approach to real-time, low-complexity target speaker enhancement, such as PercepNet, may utilize techniques for real-time target speaker audio enhancement for a monaural signal (e.g., after estimating spatial cues and downmixing from the stereo signal). Real-time target speaker audio enhancement techniques may perform conditioning on the target speaker's voice and/or other audio enhancement techniques. This enables the machine learning model for audio enhancement to distinctly identify and enhance the target speaker's utterance while suppressing all the other interferences, even in the presence of multiple talkers or other speech-like sounds. As discussed below, the enhanced monaural signal is then upmixed based on the estimated spatial cues for the target speaker in order to generate the enhanced stereo output signal. In some embodiments, the above process may be performed for any number of different target speakers.

In some embodiments, it may be assumed that there are two microphone input signals (note that in various embodiments, any number of microphone inputs may be used). The m-th microphone input signal $x_{m,t}$ (t is the time-index) may be modeled in the time domain as follows: $x_{m,t}=s_t*h_m+n_t$, where $s_t$ is the speech source signal, $h_m$ is the impulse response between the speech source location and the m-th microphone, and $n_t$ is the background noise signal. In embodiments, downmix, monaural speech enhancement based on a model (e.g., PercepNet or other model), and upmix are all carried out in the time-frequency domain. In embodiments, the time-frequency representation of $x_{m,t}$ can be written as follows: $x_{l,k}=s_{l,k}a_k+n_{l,k}$, where l is the frame-index, k is the frequency index, $x_{l,k}=[x^T_{1,l,k}\ x^T_{2,l,k}]^T$, $x_{m,l,k}$ is the time-frequency representation of the time-domain signal $x_{m,t}$, $s_{l,k}$ and $n_{l,k}$ are defined similarly. $a_k=[a_{1,k}\ a_{2,k}]^T$ is a steering vector and $a_{m,k}$ is the time-frequency representation of $h_m$.

Typically, the objective of speech enhancement is to estimate sl,k from the observed microphone input signal xl,k. In our application, the steering vector ak is also important in that it captures spatial information, so our objective is to determine both sl,k and ak from the microphone input signal xl,k. Additionally, since it is difficult and costly to retrain a DNN model for different numbers and locations of sound sources and microphones, we focus on using a single-channel DNN model pre-trained for monaural speech enhancement.

FIG. 1 illustrates a logical block diagram for real-time low-complexity stereo speech enhancement with spatial cue preservation, according to some embodiments.

In embodiments, an example stereo speech enhancement system 100 may include three steps/stages. In the first step, spatial cues for one or more target sources (e.g., speakers) represented in a stereo microphone input signal are estimated and stored as metadata (e.g., interaural phase/level differences between the different inputs for one or more target speakers), and the stereo microphone input signal is converted into a monaural signal (downmix 102). The second step includes the use of an ML model 104 and/or algorithm to enhance the monaural signal (e.g., PercepNet or other ML model). In an embodiment, the algorithm may operate on 10 ms frames with 30 ms of look-ahead, although any other amounts of time may be used in various embodiments. As mentioned above, in order to utilize a model of a single microphone as a pre-trained model (e.g., a DNN model or other pretrained ML model), the input signal for the model is generated by downmixing a stereo microphone input signal into a monaural input signal (spatial information/cues are preserved). A stereo signal may be generated from the enhanced monaural output signal of the model, by applying the preserved spatial information (e.g., applying the interaural phase and level differences to the monaural signal to generate two different output signals). Therefore, the third step includes converting the output signal of the model into a stereo signal (upmix 106).

Figure 3A:
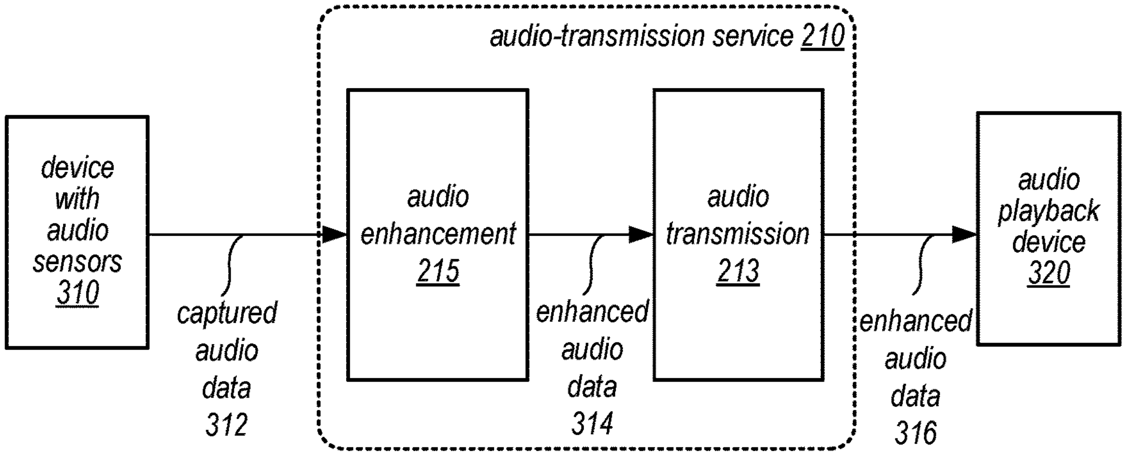
FIGS. 3A-3C illustrate logical block diagrams of different interactions of an audio sensor with provider network services, according to some embodiments.

In various embodiments, the stereo speech enhancement system 100 may be implemented as part of various network-based systems or services or stand-alone systems that receive audio data (e.g., stereo speech audio, which may include target speaker audio and various background audio from a first input signal from a left microphone and a second input signal from a right microphone) and provide as output enhanced audio data (e.g., enhanced stereo speech audio, which may include enhanced target speaker audio and various background audio of a first output signal and a second output signal). For example, a stereo speech enhancement system 100 may be implemented "service-side," as illustrated in FIG. 3A, where the audio sensors that capture the audio data may be separate from a service or system that implements stereo speech enhancement system 100. In such embodiments, the audio data may be sent from the audio sensor/microphone (e.g., over a network connection) to the system or service for stereo speech enhancement. In other embodiments, stereo speech enhancement system 100 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

In embodiments, the stereo speech enhancement system may receive, via an interface for the stereo speech enhancement system, a stereo input signal that includes a first input signal and a second input signal (e.g., a left and right input signal respectively corresponding to a left and right microphone or a right and a left input signal respectively corresponding to a right and left microphone). The first input signal may include speech data corresponding to a target speaker (e.g., generated by an audio sensor/microphone that senses the target speaker's voice) and the second input signal may include other speech data corresponding to the target speaker (e.g., generated by another audio sensor/microphone at a different location that senses the target speaker's voice).

The stereo speech enhancement system may then downmix the stereo input signal to generate a monaural signal. Before downmixing the signal, spatial cues for the target speaker are first estimated and preserved (e.g., stored as metadata) using any suitable technique (e.g., storing the spatial cues to a temporary storage location in memory or other type of data store/database). The stereo speech enhancement system then applies a ML model to the monaural signal to generate an enhanced monaural signal. In embodiments, noise in the monaural signal is reduced or removed from the monaural signal by the ML model in order to generate the enhanced monaural signal.

The stereo speech enhancement system may then upmix the enhanced monaural signal based at least on the spatial cues for the target speaker to generate an enhanced stereo output signal. The enhanced stereo output signal includes a first output signal and a second output signal. The first output signal includes enhanced speech data corresponding to the target speaker and the second output signal comprises other enhanced speech data corresponding to the target speaker. The stereo speech enhancement system may then send, via the interface of the stereo speech enhancement system, the enhanced stereo output signal to a destination. Note than in some embodiments, only a partially processed stereo signal may be provided, depending on the capabilities or needs of the target destination. For example, if the target destination only supports monaural playback (e.g., only has one speaker), then the enhanced monaural signal may be sent to the destination (in some cases, the estimated spatial cues may also be sent). In some embodiments, the monaural signal and/or the estimated spatial cues may be sent to a destination (e.g., before any processing may a model).

As described herein, various techniques may be used by the stereo speech enhancement system to perform the upmixing and/or the downmixing stages. For example, downmixing the stereo input signal may include applying beamforming to the stereo input signal (e.g., delay-and-sum beamforming). In some embodiments, to estimate the spatial cues (e.g., spatial information), the stereo speech enhancement system may estimate steering information (e.g., an estimated steering vector) of the target speaker. The system may apply the delay-and-sum beamforming to the stereo input signal using the estimated steering information (e.g., the estimated steering vector) to generate the monaural signal.

In some embodiments, upmixing the enhanced monaural signal may include applying steering information of the target speaker to the enhanced monaural signal (e.g., multiplying an estimated steering vector of the target speaker with the enhanced monaural signal). In embodiments, the stereo speech enhancement system may estimate a steering vector of the target speaker using principal component analysis of an estimated spatial covariance matrix. In some embodiments, the stereo input signal is captured along with corresponding video data, and the video data may be provided to a same destination as the enhanced stereo output signal.

This specification includes a general description of a provider network that implements multiple different services (FIG. 2), including an audio-transmission service, which may implement real-time low-complexity stereo speech enhancement for transmitted audio. Then various examples of, including different components/modules, or arrangements of components/modules that may be employed as part of implementing the services are discussed in FIGS. 3A-3C. A number of different methods and techniques to implement real-time low-complexity stereo speech enhancement are then discussed (e.g., different systems for downmixing and/or upmixing), some of which are illustrated in accompanying flowcharts. Finally, a description of an example computing system upon which the various components, modules, systems, devices, and/or nodes may be implemented is provided. Various examples are provided throughout the specification.

Downmix

Using traditional techniques, downmixing may be performed by averaging a stereo signal. However, averaging may cause cancellation of a speech signal and may lead to performance degradation. Instead of averaging a stereo signal, conversion of a stereo input signal into a monaural signal is done by using a beamforming technique, in embodiments. Downmix may be done by using delay and sum beamforming (DSBF) for the purpose of avoiding signal cancellation related to adaptive beam-forming techniques. Let blk be the estimated steering vector. The downmixed monaural signal dlk is obtained as follows: dlk=$b^{H}$l,k xl,k, where H is the Hermitian transpose operator of a matrix/vector. To perform DSBF, the steering vector of the speech source blk is estimated. blk is estimated by using principal component analysis (PCA) with an estimated spatial covariance (SCM).

Spatial Covariance Matrix Estimation

To perform real-time speech enhancement, a SCM Rl,k is updated in an online manner as follows: Rlk=γlkRl−1,k+(1−γlk)$x_{lk}x_{lk}^{H}$, and γlk=1−$\mathcal{M}$ lk (1−α), where α is the forgetting factor. $\mathcal{M}$ lk is a time-frequency mask which controls updating of the SCM depending on presence of a speech source at each time-frequency bin. When a speech source is present, $\mathcal{M}$ lk is close to 1. On the other hand, when a speech source is absent, $\mathcal{M}$ lk is close to 0. The time-frequency mask $\mathcal{M}$ lk may be estimated in two ways: time averaging of microphone input signal (TAM) or time-frequency masking based on speech enhancement output (TFMSE).

Time Averaging of Microphone Input Signal (TAM)

When there is no information about the presence of the speech source at each time-frequency bin, the best way is to assume that there is always a speech source. In this case, the time-frequency mask should be determined as follows: $\mathcal{M}$ lk=1. This is corresponding to time-averaging of microphone input signal for SCM estimation. When noise signal is uncorrelated between channels and noise level is relatively lower than speech signal level, time-averaging works well. However, SCM estimation accuracy degrades when the noise level is relatively bigger than speech signal level or noise signal is correlated between channels.

Time-Frequency Masking Based on Speech Enhancement Output (TFMSE)

Figure 2:
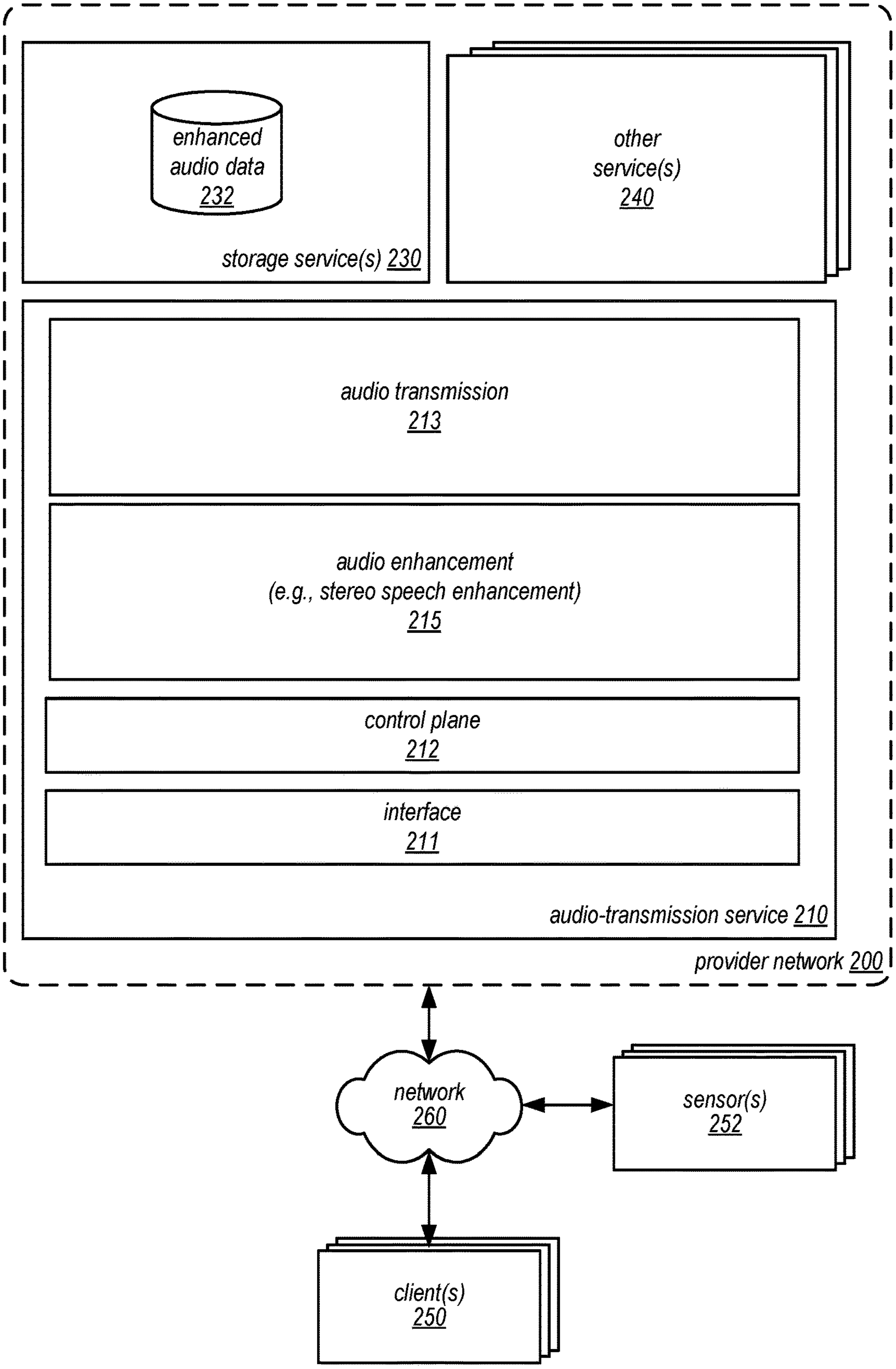
FIG. 2 illustrates an example provider network that may implement an audio-transmission service that implements real-time low-complexity stereo speech enhancement with spatial cue preservation, according to some embodiments.

To avoid degradation of performance in SCM estimation, it may be important to extract time-frequency bins in which speech sources are dominant. Application of monaural speech enhancement result for estimation of time-frequency masks may be performed as follows: $\mathcal{M}$ lk=$\|c_{lk}\|/\|x_{lk}\|$, where $c_{lk}$ is an enhanced speech signal. clk can be generated by multiplying a steering vector with a monaural speech enhance-ment result. Let slk be the output monaural signal after speech enhancement. So as to compare ŝlk with the microphone in-put signal, a temporal upmix is done, and we can obtain stereo noiseless signal as follows: ĉlk=ŝlkâlk, where âlk is the estimated steering vector of the speech signal. Block diagram of this approach is shown in FIG. 2. To obtain the monaural speech enhancement result, a feedback loop between downmix and upmix is utilized. Thanks to the feedback loop, the number of DNN inferences is one pass per frame. In various embodiments, there are other variants of TFMSE. For example, instead of using the feedback loop, a stereo enhanced speech signal may be obtained by executing a model (e.g., PercepNet) for each channel separately. In such an embodiment, the model may be executed twice per frame.

Upmix

Upmix converts a monaural signal into a stereo signal. Upmix may be performed in two ways: steering vector multiplication or a common gain-based method.

Steering Vector Multiplication

Steering vector multiplication converts a monaural signal into a stereo signal by multiplying an estimated steering vector with the monaural signal. In embodiments, the steering vector may be estimated for the upmix stage in the same or similar way as it is estimated for the downmix stage. Let elk be the estimated steering vector for upmix. The upmixed signal may be obtained as follows: flk=dlkelk, where f is the output stereo signal. Similar to downmix, the steering vector is estimated via PCA of the estimated SCM. We can utilize TAM and TFMSE for SCM estimation.

Common Gain-Based Method

Sharing time-frequency gain between channels is known as an effective approach for spatial-cue preservation [25]. Our common gain based method shares 32 band gains estimated in PercepNet between channels. The common gain has been typically applied for a noisy microphone input signal. We call this method common1. However, common1 lacks of utilization of beamforming capability. Another approach is to apply the common band gain for the enhanced speech signal, i.e., clk in Eq. 8. We call this method common2. In common2, upmix can be interpreted as a hybrid combination of steering vector multiplication and a common band gain multiplication.

In various embodiments, a hybrid framework combines model-based monaural speech enhancement (e.g., DNN model) and array signal processing as a real time stereo speech enhancement technique that preserves spatial cues. Both spatial cue preservation performance and speech enhancement performance can be improved by using beamforming based downmix and steering vector multiplication based upmix. In embodiments, time-frequency masking based steering vector estimation and/or a common gain approach for a beamformer output may be quite effective. In some embodiments, one DNN inference per frame may be sufficient using techniques discussed herein. Using embodiments discussed herein, there may be a significant advantage in terms of computational cost over traditional techniques, especially when the number of microphones is large. Furthermore, embodiments may be easily extended to more general multichannel speech enhancement algorithms without DNN retraining.

FIG. 2 illustrates an example provider network that may implement an audio-transmission service that implements real-time low-complexity stereo speech enhancement with spatial cue preservation, according to some embodiments.

Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1200 described below with regard to FIG. 12), needed to implement and distribute the infrastructure and services offered by the provider network 200, in one embodiment. In some embodiments, provider network 200 may implement various computing resources or services, such as audio-transmission service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below, in one embodiment. In various embodiments, the functionality of a given system or service component (e.g., a component of audio-transmission service 210 may be implemented by a particular node or may be distributed across several nodes. In some embodiments, a given node may implement the functionality of more than one service system component (e.g., more than one data store component).

Audio-transmission service 210 may implement interface 211 to allow clients (e.g., client(s) 250 or clients implemented internally within provider network 200, such as a client application hosted on another provider network service like an event driven code execution service or virtual compute service) to send audio data (e.g., stereo speech input signals) for enhancement, storage, and/or transmission. In at least some embodiments, audio-transmission service 210 may also support the transmission of video data along with the corresponding audio data and thus may be an audio/video transmission service, which may perform the various techniques discussed above with regard to FIG. 1 and below with regard to FIGS. 3A-10 for audio data captured along with video data, in some embodiments. For example, audio-transmission service 210 may implement interface 211 (e.g., a graphical user interface, programmatic interface that implements Application Program Interfaces (APIs) and/or a command line interface) may be implemented so that a client application can submit an audio stream captured by sensor(s) 252 to be stored as enhanced audio data 232 stored in storage service(s) 230, or other storage locations or resources within provider network 200 or external to provider network 200 (e.g., on premise data storage in private networks). Interface 211 may allow a client to cause audio enhancement using the techniques discussed above with regard to FIG. 1 and below with regard to FIGS. 3A-10, (e.g., as part of audio transmission, such as voice transmission like Voice over IP (VoIP).

Audio-transmission service 210 may implement a control plane 212 to perform various control operations to implement the features of audio-transmission service 210. For example, control plane 212 may monitor the health and performance of requests at different components audio-transmission 213 and audio enhancement 215 (e.g., the health or performance of various nodes implementing these features of audio-transmission service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 3B:
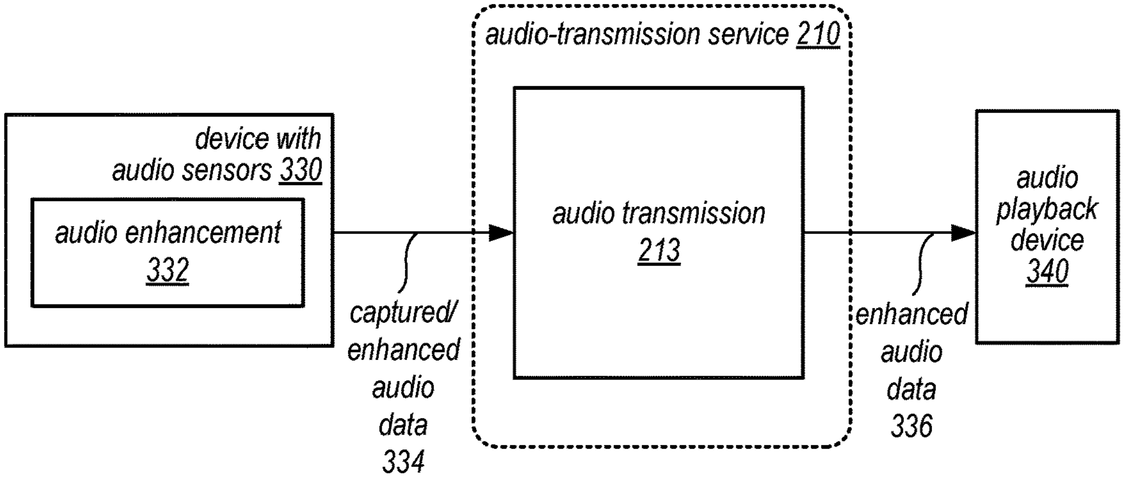

Audio-transmission service 210 may implement audio-transmission 213, which may facilitate audio communications (e.g., for audio-only, video, or other speech communications), speech commands or speech recordings, or various other audio transmissions, as discussed in the examples below with regard to FIGS. 3A and 3B. Audio-transmission service 210 may implement audio enhancement 215 to provide an audio enhancement system (e.g., stereo speech enhancement system 100 in FIG. 1 or a similar system), which may implement audio enhancement systems, like those discussed below with regard to FIGS. 4-10 and techniques like those discussed below with regard to FIG. 11.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Enhanced audio 232 may be put and/or retrieved from data storage service(s) 230 via an interface for data storage services 230, in some embodiments, as discussed below with regard to FIG. 3C.

Generally speaking, clients 250 may encompass any type of client that can submit network-based requests to provider network 200 via network 260, including requests for audio-transmission service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of audio-transmission service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like audio-transmission service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Sensor(s) 252, such as microphones, may, in various embodiments, collect, capture, and/or report various kinds of audio data, (or audio data as part of other captured data like video data). Sensor(s) 252 may be implemented as part of devices, such as various mobile or other communication and/or playback devices, such as microphones embedded in "smart-speaker" or other voice command-enabled devices. In some embodiments, some or all of audio enhancement techniques may be implemented as part of devices that include sensors 252 before transmission of enhanced audio to audio-transmission service 210, as discussed below with regard to FIGS. 3B and 3C. For example, the downmix stage may be performed by a local/client device at a client network, and then the monaural signal (along with the metadata with the preserved spatial cues) can be transmitted to the provider network in order to perform the remaining processing at the provider network (e.g., the model processing and the upmix processing) to generate the enhanced stereo output.

Figure 3C:
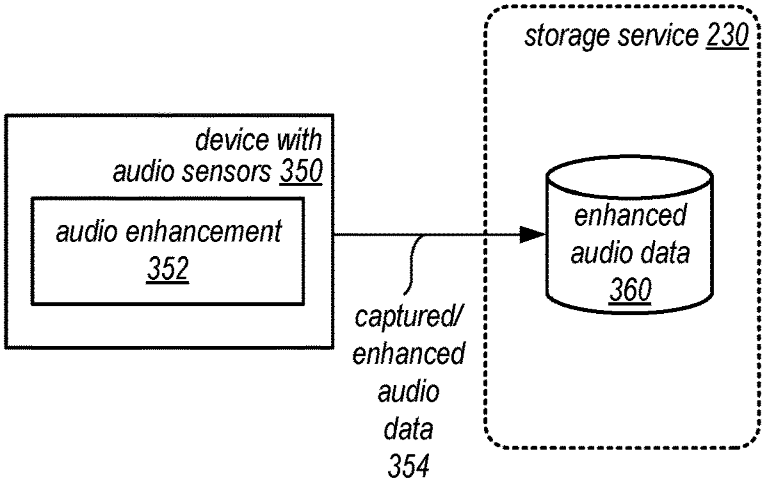

As discussed above, different interactions between sensors that capture audio data and services of a provider network 200 may invoke audio enhancement, in some embodiments. FIGS. 3A-3C illustrate logical block diagrams of different interactions of an audio sensor with provider network services, according to some embodiments.

In FIG. 3A, audio sensor 310 may capture audio data from various environments, including speech audio from noisy environments as discussed above with regard to FIG. 1. Device with audio sensor 310 may send directly captured audio data 312 to audio-transmission service 210, in some embodiments, via an interface for audio-transmission service 210 (e.g., interface 211), such as by sending captured audio data 312 over wired or wireless network connection to audio-transmission service 210. In some embodiments, device with audio sensor 310 may provide the captured audio data to another device that sends the capture audio data 312 to audio-transmission service (not illustrated). Capture audio data may be transmitted as an audio file or object, or as a stream of audio, in some embodiments. For instance, for live communications, such as a VoIP call, captured audio data 312 may be a stream of audio data.

Audio-transmission service 210 may process captured audio data 312 through audio enhancement 215 (e.g., stereo speech enhancement), in various embodiments. For example, an audio enhancement systems like those discussed below with regard to FIGS. 1 and 4-10 may be implemented to provide enhanced audio data 314, including enhanced stereo output signals as discussed above with regard to FIG. 1 and below with regard to FIGS. 4-10. Audio transmission 213 may receive the enhanced audio data 314, identify a destination for the enhanced audio, such as audio playback device 320, and send the enhanced audio data 316 to audio playback device 320, in some embodiments. Given the improvements to audio quality provided by audio enhancement, including the reduction of noisy bands with ratio mask post-filtering, audio playback device 320 may play the enhanced audio data 316 to one or more listeners (e.g., which may benefit from the improvements to the captured audio data in the form of more clear and perceptible speech).

Audio enhancement systems may also be implemented separately from audio-transmission service 210, in some embodiments. For example, as illustrated in FIG. 3B, device with audio sensor 330 may also implement audio enhancement 332, which may be a system for stereo speech enhancement like those discussed below with regard to FIGS. 4-10 may be implemented to provide enhanced audio data 334

(e.g., enhanced stereo output), as discussed above with regard to FIG. 1 and below with regard to FIGS. 4-10. Audio enhancement 332 may be implemented as part of other pre-transmission processing implemented by device with audio sensor 330, such as various encryption, compression, or other operations performed on capture audio data prior to transmission to audio-transmission service 210.

Device with audio sensor 330 may then send the capture/enhanced audio data 334 to audio-transmission service 210 for transmission (e.g., via interface 211), in some embodiments. Audio transmission 213 may receive the enhanced audio data 334, identify a destination for the enhanced audio, such as audio playback device 340, and send the enhanced audio data 336 to audio playback device 340, in some embodiments.

As mentioned above, in various embodiments, any portions of the audio enhancement process may be performed at the local client network (e.g., by the device with audio sensors 330), and remaining portions of the audio enhancement process may be performed by the provider network. For example, the downmix stage may be performed by a local/client device at a client network, and then the monaural signal (along with the estimated spatial cues) can be transmitted to the provider network in order to perform the remaining processing at the provider network (e.g., the model processing and the upmix processing) to generate the enhanced stereo output. As another example, the model processing of the monaural signal may be performed by a local/client device at a client network, and the enhanced monaural signal may then be transmitted to the provider network (along with the estimated spatial cues) in order to perform the remaining processing at the provider network (e.g., the upmix processing) to generate the enhanced stereo output.

In some embodiments, audio may be stored for later retrieval and/or processing. As illustrated in FIG. 3C, device with audio sensor 350 may also implement audio enhancement 352, which may be a system for stereo speech enhancement like those discussed below with regard to FIGS. 4-10 to provide enhanced audio data 354, including enhanced stereo output as discussed above with regard to FIG. 1. Audio enhancement 352 may be implemented as part of other pre-transmission processing implemented by device with audio sensor 350, such as various encryption, compression, or other operations performed on capture audio data prior to storage in storage service 230. Device with audio sensor 350 may then store the capture/enhanced audio data 354 to storage service 230, which may store enhanced audio data 360 until retrieved for future processing and/or playback, in some embodiments.

Figure 4:
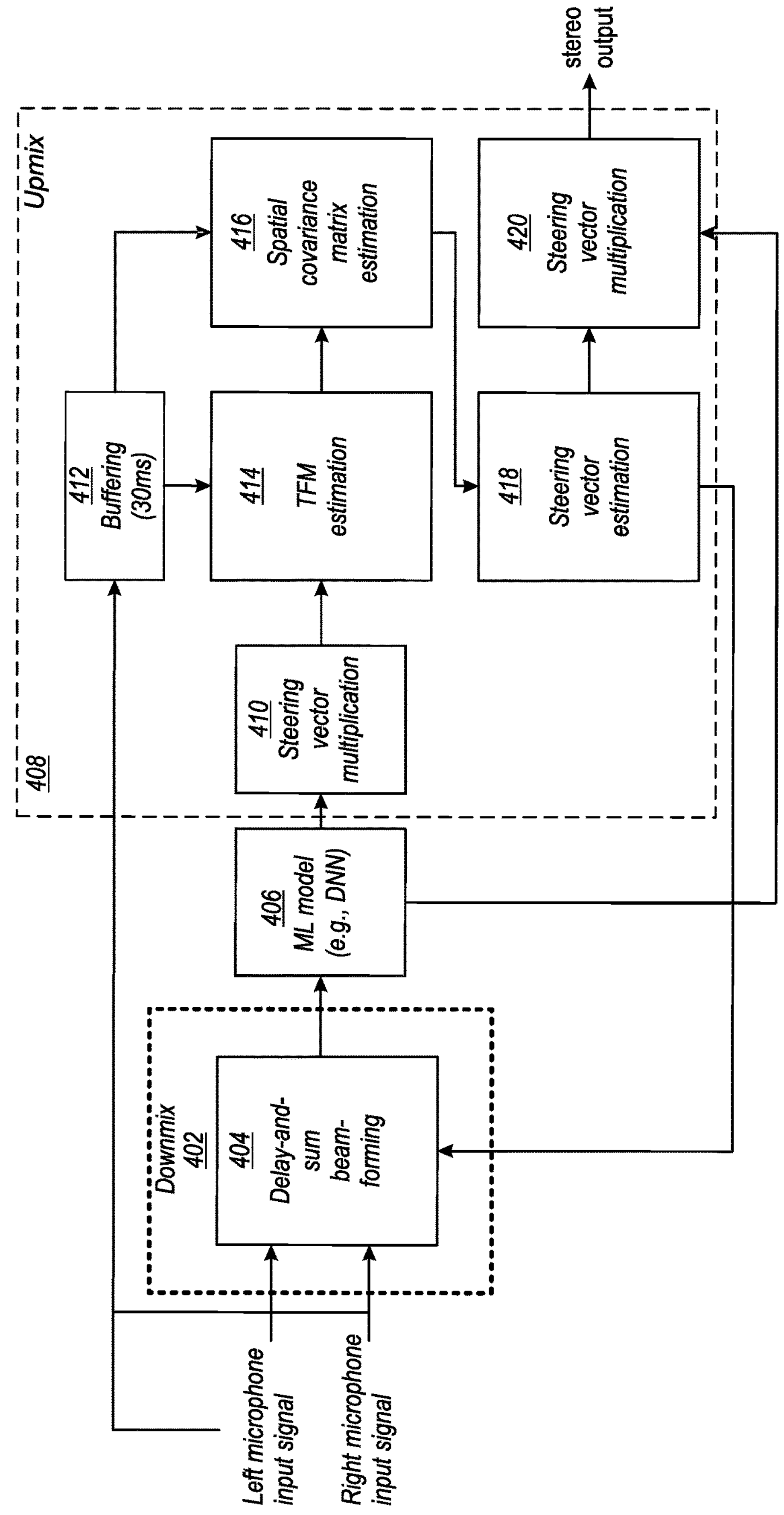
FIG. 4 illustrates a logical block diagram of an example algorithm used for real-time low-complexity stereo speech enhancement with spatial cue preservation, according to some embodiments.

FIG. 4 illustrates a logical block diagram of an example algorithm used for real-time low-complexity stereo speech enhancement with spatial cue preservation, according to some embodiments. As shown, at the downmix stage 402, delay-and-sum beamforming 404 is applied to the left and right input signals (the stereo signal) to convert the stereo input signal into a monaural signal. The monaural signal is then processed by the ML model 406, where the speech signal is enhanced. In embodiments, a speech-only time frequency bin is used in order to optimize a speech enhancement filter. The time frequency bins may be extracted from the output of the ML model; therefore, the feedback structure may be important.

The upmix stage 408 performs additional processing on the output of the ML model as well as the input signals. As shown, steering vector multiplication 410 is performed on results of the ML model. Buffering 412 (30 ms delay) receives the left and right input signal and provides the input signals to TFM estimation 414 as well as spatial covariance matrix estimation 416. TFM estimation 414 is performed based on the input signals and the output of steering vector multiplication 410. Spatial covariance matrix estimation 416 is performed based on the input signals and the output of TFM estimation 414. Steering vector estimation 418 is performed based on the output of spatial covariance matrix estimation 416. The steering vector estimation 418 sends its output to the additional steering vector multiplication 420 as well as to the delay-and-sum beamforming 404 of the downmix stage. The steering vector multiplication 420 is performed based on output from the ML model 406 and the steering vector estimation 418 to produce the stereo output.

Figure 5:
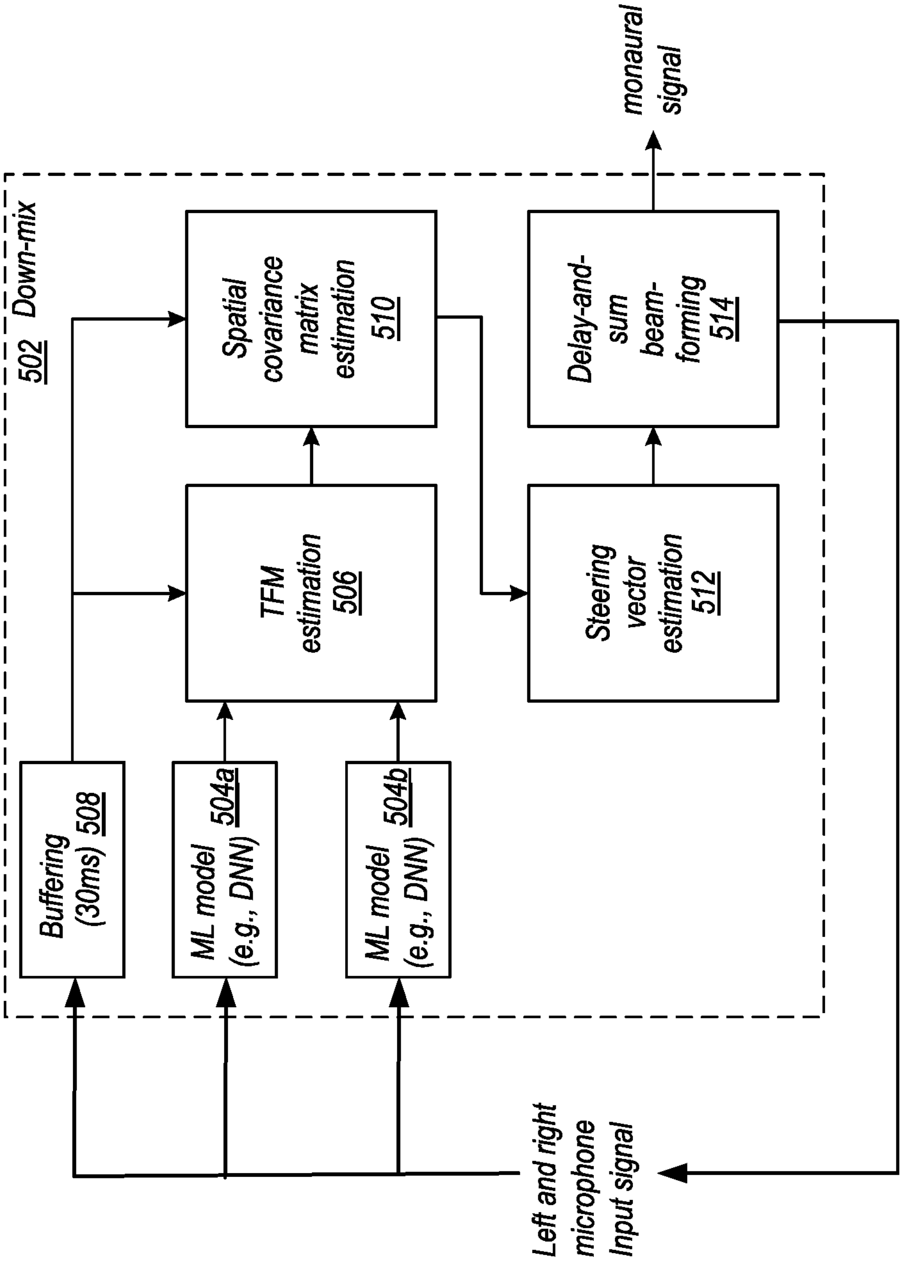
FIG. 5 illustrates a logical block diagram of an example algorithm used for real-time low-complexity stereo speech enhancement with spatial cue preservation, according to some embodiments.

FIG. 5 illustrates a logical block diagram of an example algorithm used for real-time low-complexity stereo speech enhancement with spatial cue preservation, according to some embodiments. The algorithm of FIG. 5 has the same middle portion (ML model 406) and the same upmix (upmix 408) of FIG. 4; the only difference between the algorithms is the downmix 502, which replaces the downmix 402 of FIG. 4. As shown, in order to obtain time-frequency bins in which the speech signal is dominant, the same ML model 504*a* and 504*b* is performed for each channel separately (e.g., left input and right input), and time-frequency masks are estimated.

The output of each ML model 504 is provided for TFM estimation 506 (ML models 504*a* and 504*b* may be the same type of model/identical models, in embodiments). Buffering 508 (30 ms delay) also provides the left and right input signals to TFM estimation 506. TFM estimation is performed on the above inputs to provide an output for spatial covariance estimation 510. Spatial covariance estimation 510 is performed based on this output as well as the buffered left and right input signals. The output is provided for steering vector estimation 512. The output of steering vector estimation 512, as well as the left and right input signals, is provided for delay-and-sum beamforming 514 to produce the monaural signal.

Figure 6:
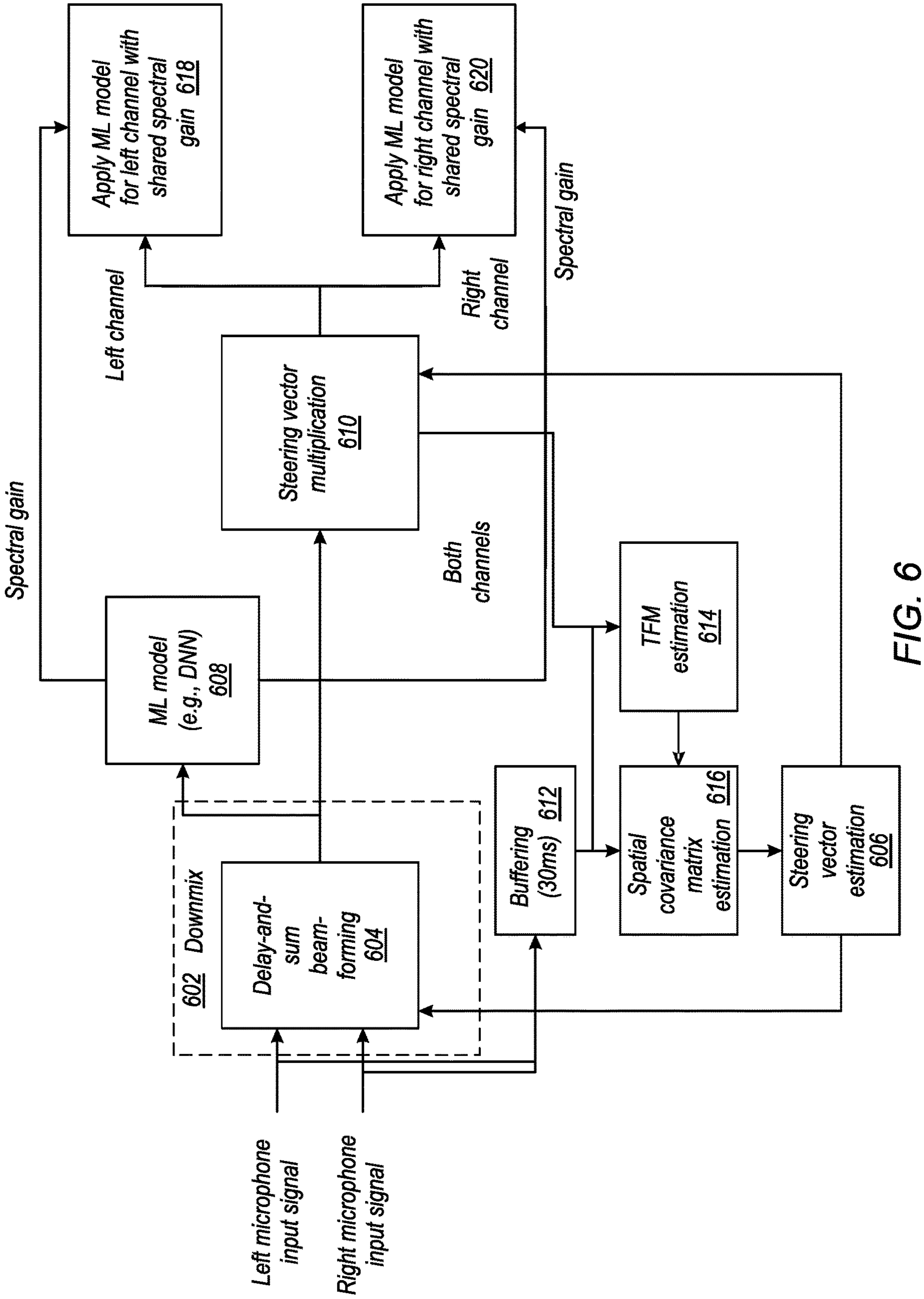
FIG. 6 illustrates a logical block diagram of an example algorithm used for real-time low-complexity stereo speech enhancement with spatial cue preservation, according to some embodiments.

FIG. 6 illustrates a logical block diagram of an example algorithm used for real-time low-complexity stereo speech enhancement with spatial cue preservation, according to some embodiments. In the depicted example, the band gain hat gb is shared between each channel. As shown, the downmix 602 stage performs delay-and-sum beamforming 604 (DSBF) with the left input signal, right input signal, and steering vector estimation 606 as inputs. The ML model 608 and the steering vector multiplication 610 receives the monaural signal output from the downmix 602 stage. As shown, the example algorithm performs various operations in the upmix stage to produce an enhanced stereo signal, including buffering 612, TFM estimation 614, spatial covariance matrix estimation 616, applying the ML model for the left channel with shared spectral gain 618, and applying the ML model for the left channel with shared spectral gain 620.

Figure 7:
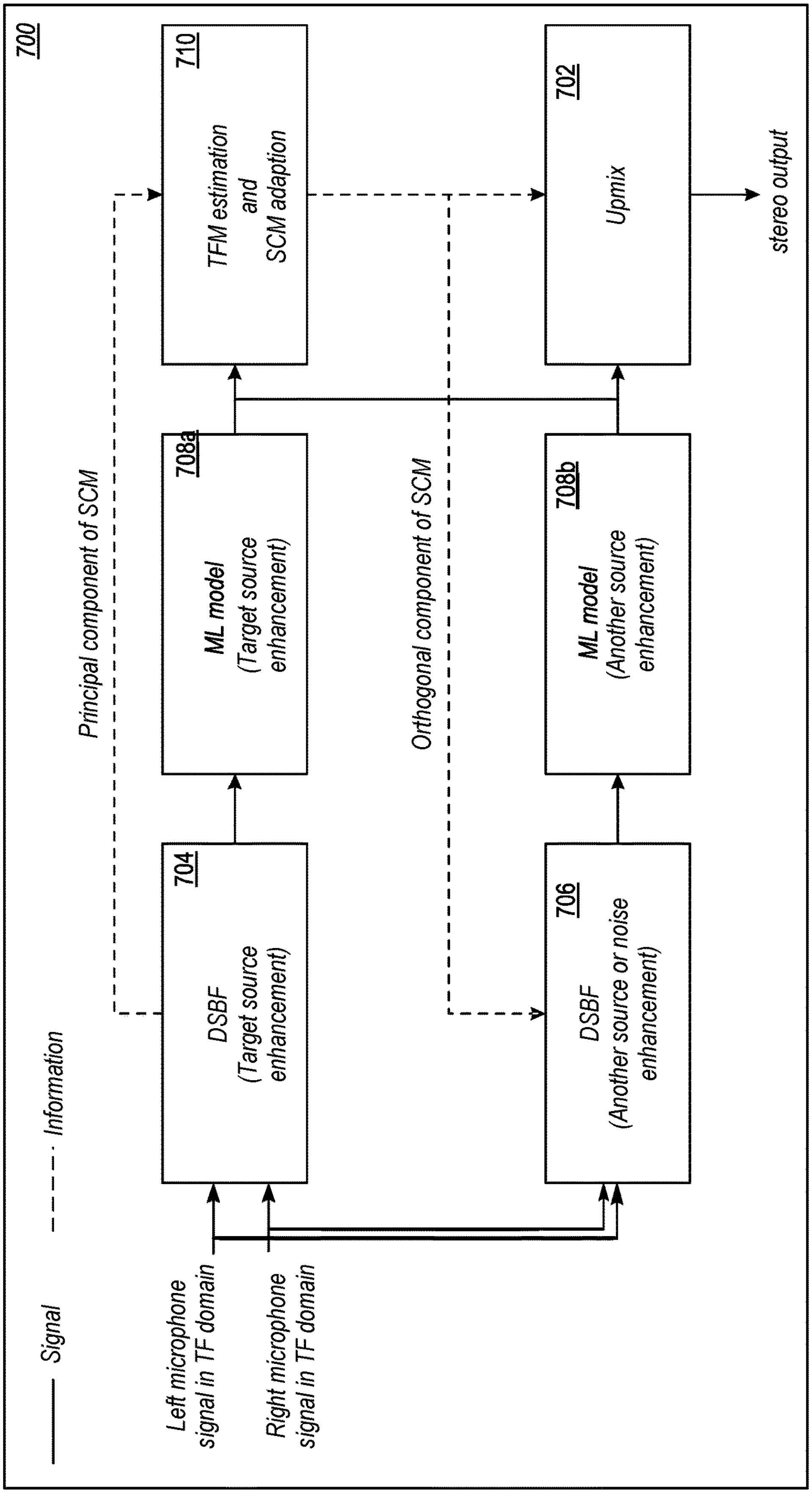
FIG. 7 illustrates a logical block diagram of an example algorithm used for real-time low-complexity stereo speech enhancement with spatial cue preservation, according to some embodiments.
Figure 8:
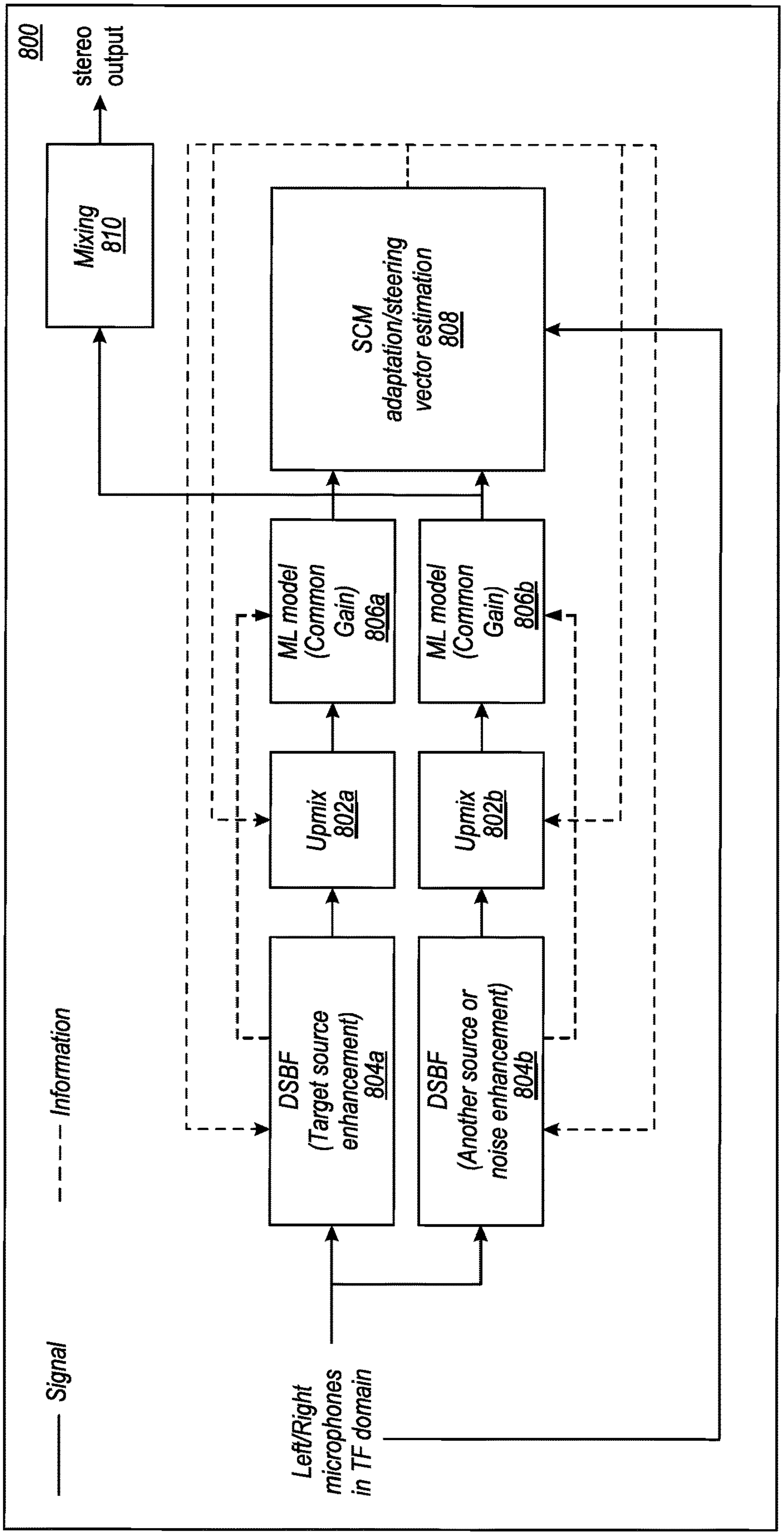
FIG. 8 illustrates a logical block diagram of an example algorithm used for real-time low-complexity stereo speech enhancement with spatial cue preservation, according to some embodiments.
Figure 9:
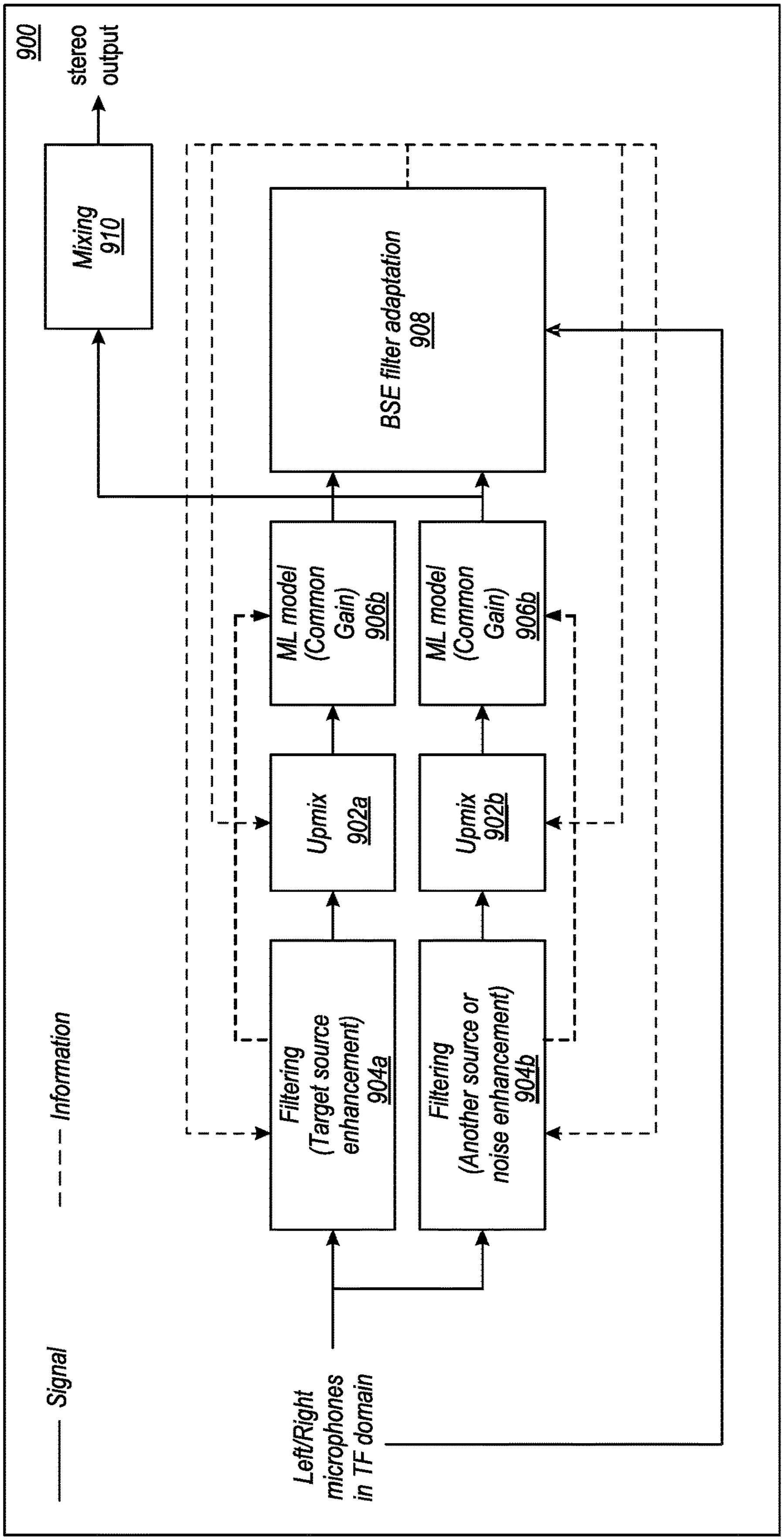
FIG. 9 illustrates a logical block diagram of an example algorithm used for real-time low-complexity stereo speech enhancement with spatial cue preservation, according to some embodiments.

FIG. 7 illustrates a logical block diagram of an example algorithm used for real-time low-complexity stereo speech enhancement with spatial cue preservation, according to some embodiments. As shown in FIGS. 7-9, some of the stages send information to another stage, so that the other stage can take that information into account in order to produce an output signal and/or to output additional information. The illustrated example is an extension of the algorithm of FIG. 4. The depicted algorithm performs target source enhancement as well as another source or noise enhancement. In an embodiment, the upmix 702 stage is steering vector multiplication.

As shown, the example algorithm uses DSBF 704 for target source enhancement and DSBF 706 for another source or noise enhancement. The same ML model 708*a* and 708*b* (e.g., different ML models that are the same type of model/identical models, in embodiments) is performed for the target source and the other source or noise. As shown, TFM estimation and SCM adaption is also performed 710. In an embodiment, the upmix 702 step may perform steering vector multiplication.

FIG. 8 illustrates a logical block diagram of an example algorithm used for real-time low-complexity stereo speech enhancement with spatial cue preservation, according to some embodiments. The illustrated example is an extension of the algorithm of FIG. 6. The depicted algorithm performs target source enhancement as well as another source or noise enhancement. In an embodiment, the upmix 802*a*, 802*b* stage is steering vector multiplication.

As shown, the example algorithm uses DSBF 804*a* for target source enhancement and DSBF 804*b* for another source or noise enhancement. The same ML model 806*a* and 806*b* (e.g., different ML models that are the same type of model/identical models, in embodiments) is performed for the target source and the other source or noise. As shown, SCM adaption/steering vector estimation is also performed 808. Mixing 810 is performed on the output of the ML models 806*a*, 806*b* to generate the enhanced stereo output.

FIG. 9 illustrates a logical block diagram of an example algorithm used for real-time low-complexity stereo speech enhancement with spatial cue preservation, according to some embodiments. The illustrated example is an extension of the algorithm of FIG. 8; instead of DSBF, blind source extraction 908 (BSE) is utilized. The depicted algorithm performs target source enhancement as well as another source or noise enhancement. In an embodiment, the upmix 902*a*, 902*b* stage is steering vector multiplication.

As shown, the example algorithm uses filtering 904*a* for target source enhancement and filtering 904*b* for another source or noise enhancement. The same ML model 906*a* and 906*b* (e.g., different ML models that are the same type of model/identical models, in embodiments) is performed for the target source and the other source or noise. As shown, BSE filter adaptation is also performed 908. Mixing 910 is performed on the output of the ML models 906*a*, 906*b* to generate the enhanced stereo output.

Figure 10:
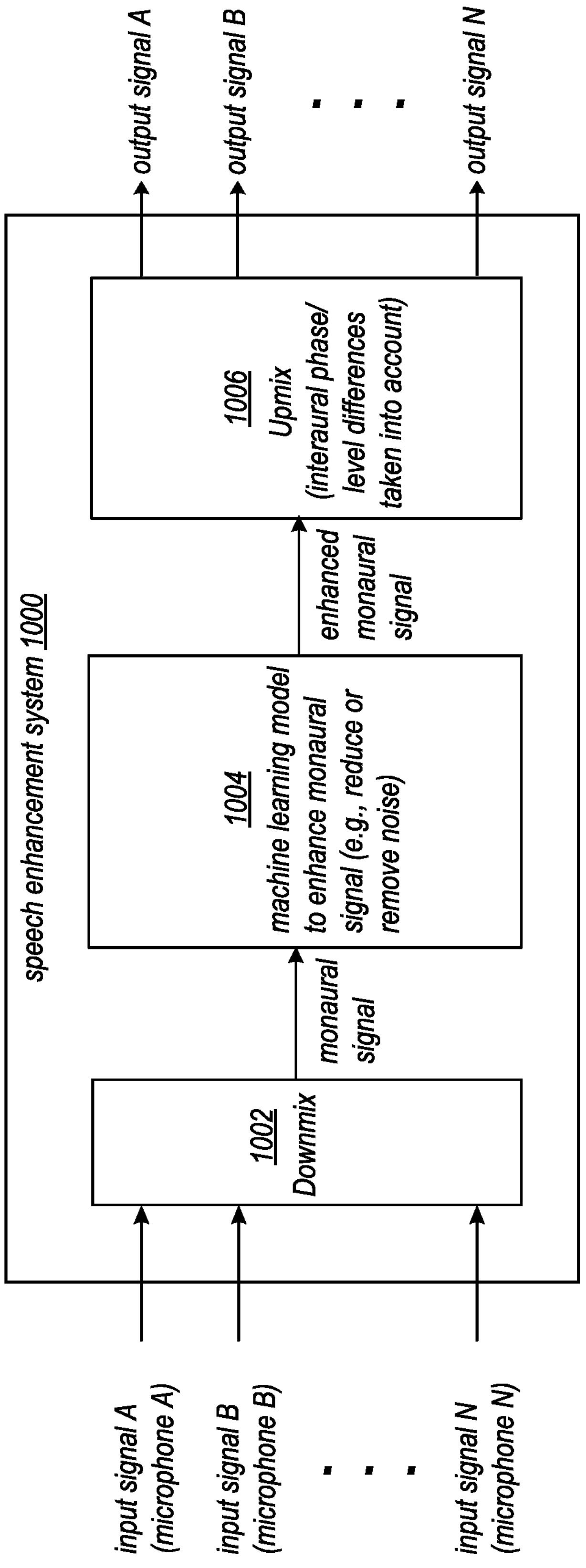
FIG. 10 illustrates a logical block diagram of an example algorithm used for real-time low-complexity speech enhancement with spatial cue preservation that processes multiple input signals, according to some embodiments.

FIG. 10 illustrates a logical block diagram of an example algorithm used for real-time low-complexity speech enhancement with spatial cue preservation that processes multiple input signals, according to some embodiments.

In various embodiments, any number of microphones may be used during a teleconference, resulting in multiple input signals/channels. The illustrated stereo speech enhancement system 1000 represents an extension of the speech enhancement system described in FIG. 1, in which three or more different microphones provide three or more corresponding input signals. In embodiments, two or more input signals (e.g., based on two or more respective microphones) may be referred to as a "multisource" signal. A stereo input signal may be a type of multisource input signal that includes a first input signal and a second input signal (e.g., a left input signal and a right input signal). Therefore, the downmix 1002, ML model 1004, and the upmix 1006 may perform the same or similar functionality for any number of input signals as is performed by the downmix 102, ML model 104, and the upmix 106 of FIG. 1 for the first and second input signals. The three or more input signals may be processed in accordance with any of the techniques and algorithms discussed herein to generate three or more corresponding enhanced output signals (e.g., by implementing real-time low-complexity speech enhancement with spatial cue preservation on the three or more input signals). This may allow interaural phase/level differences to be taken into account for any number of microphones when generating enhanced output signals for the microphones.

Although FIGS. 2-10 have been described and illustrated in the context of a provider network implementing an audio-transmission service, the various components illustrated and described in FIGS. 2-10 may be easily applied to other systems that implement audio enhancement. As such, FIGS. 2-10 are not intended to be limiting as to other embodiments for audio enhancement.

Figure 11:
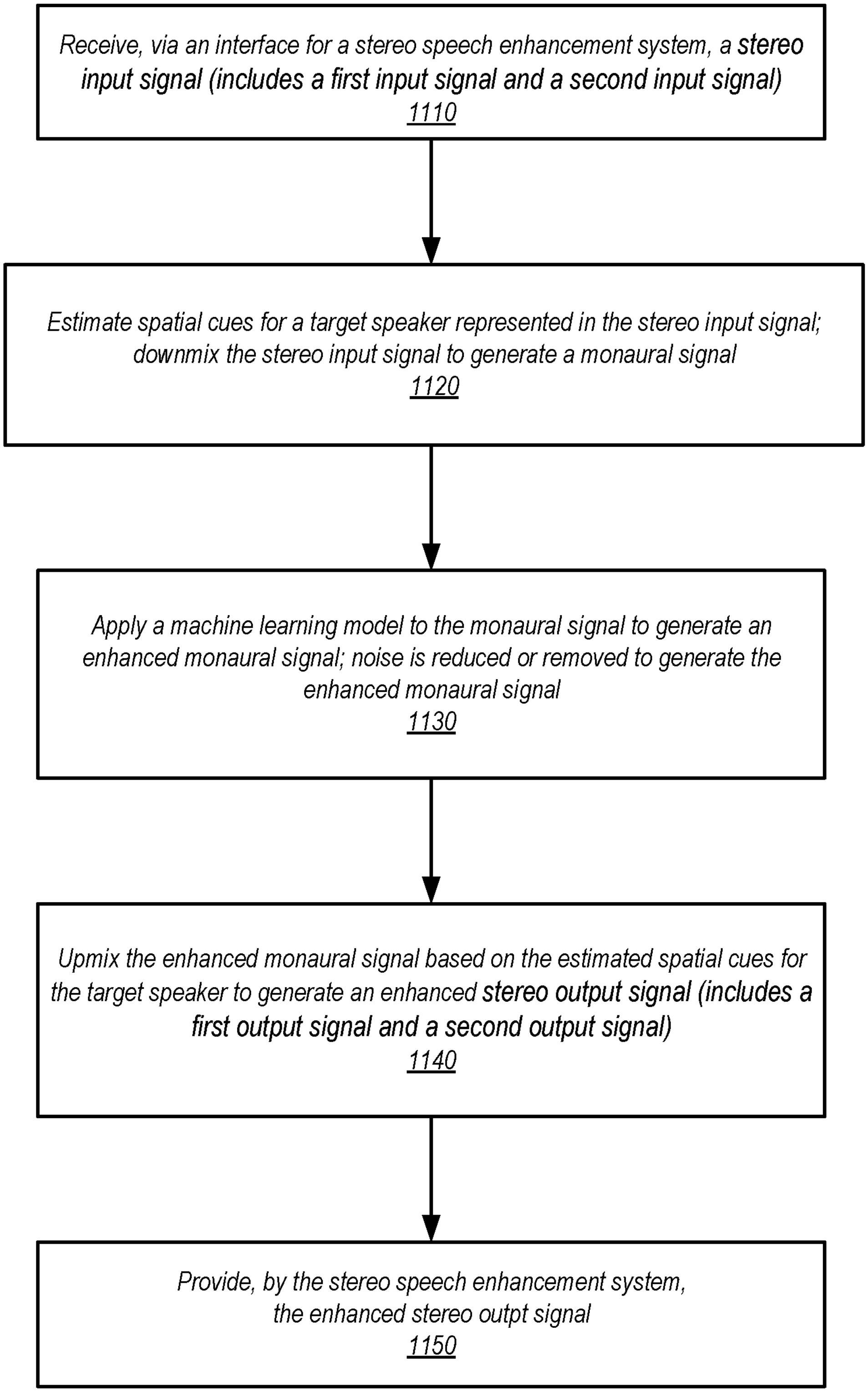
FIG. 11 illustrates a high-level flowchart of various methods and techniques to implement real-time low-complexity speech enhancement with spatial cue preservation, according to some embodiments.

FIG. 11 illustrates a high-level flowchart of various methods and techniques to implement real-time low-complexity speech enhancement with spatial cue preservation, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 1110, a stereo speech enhancement system may receive, via an interface for the stereo speech enhancement system, a stereo input signal (a first input signal and a second input signal). For example, the stereo input signal may be received from two or more audio sensors, as discussed above with regard to FIGS. 2-3A and provided to a provider network service, like audio-transmission service 210, or may be received at an audio enhancement system implemented as part of an edge or other device that performs audio enhancement before transmitting the enhanced audio data to a provider network service, as discussed above with regard to FIGS. 3B-3C, or may be recorded, uploaded, or otherwise submitted to another system that implements audio enhancement, as discussed above with regard to FIG. 1. In some embodiments, the audio data may be encrypted and/or compressed when received. Accordingly, the received audio data may be decrypted and decompressed by the audio enhancement system.

As indicated at 1120, the stereo speech enhancement system estimates spatial cues for a target speaker represented in the stereo input signal and downmixes the stereo input signal to generate a monaural signal. The spatial cues are stored for later use during the upmixing stage (e.g., as metadata/side information). As indicated at 1130, the stereo speech enhancement system may apply a machine learning model to the monaural signal to generate an enhanced monaural signal; noise is reduced or removed to generate the enhanced monaural signal. As indicated at 1140, the stereo speech enhancement system may upmix the enhanced monaural signal based on the estimated spatial cues for the target speaker to generate an enhanced stereo input signal (the stereo signal includes a first output signal and a second output signal). The output signals of the stereo signal may have different interaural phases and/or levels based on the estimated spatial cues, allowing a listener to perceive a location of the speaker and movement of the speaker as the speaker is talking.

As indicated at 1150, the stereo speech enhancement system may provide the enhanced stereo output signal (e.g., stored, transmitted, or otherwise communicated), in some embodiments (e.g., as discussed above with regard to FIGS. 1-3C). For example, the enhanced stereo output signal may be sent by an audio (or audio-video) transmission service to another as part of a two-way audio or video communication between devices that capture, send, and receive audio data. In some embodiments, the enhanced stereo output signal may be stored for subsequent access or replay.

The methods described herein may in various embodiments be implemented by any combination of hardware and software. For example, in one embodiment, the methods may be implemented on or across one or more computer systems (e.g., a computer system as in FIG. 12) that includes one or more processors executing program instructions stored on one or more computer-readable storage media coupled to the processors. The program instructions may implement the functionality described herein (e.g., the functionality of various servers and other components that implement the stereo speech enhancement system described herein). The various methods as illustrated in the figures and described herein represent example embodiments of methods. The order of any method may be changed, and various elements may be added, reordered, combined, omitted, modified, etc.

Figure 12:
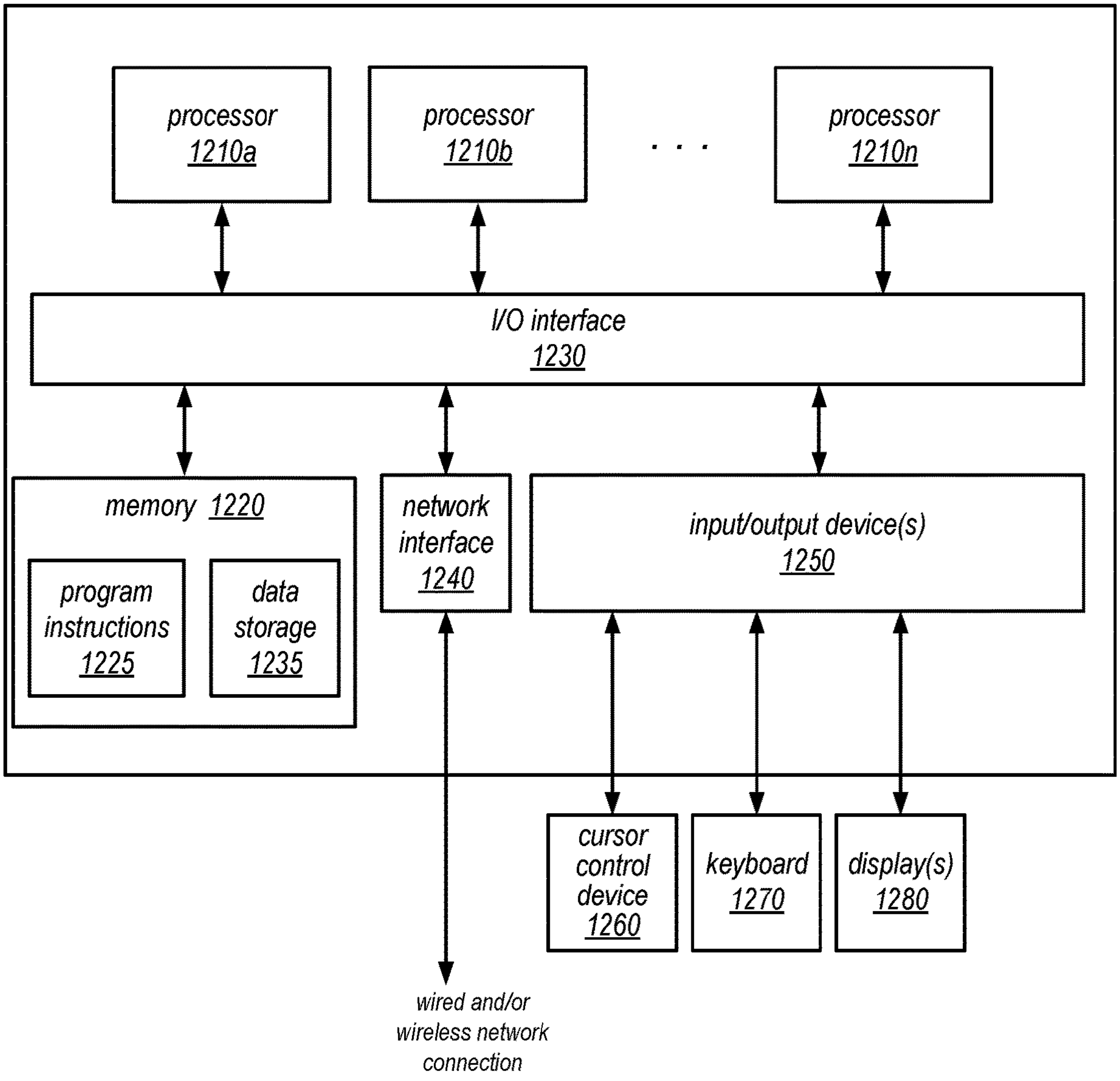
FIG. 12 illustrates an example system to implement the various methods, techniques, and systems described herein, according to some embodiments.

Embodiments of real-time low-complexity speech enhancement with spatial cue preservation as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. Display(s) 1280 may include standard computer monitor(s) and/or other display systems, technologies or devices. In at least some implementations, the input/output devices 1250 may also include a touch or multi-touch enabled device such as a pad or tablet via which a user enters input via a stylus-type device and/or one or more digits. In some embodiments, it is contemplated that embodiments may be implemented using a single instance of computer system 1200, while in other embodiments multiple such systems, or multiple nodes making up computer system 1200, may host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a non-transitory, computer-readable storage medium may include storage media or memory media such as magnetic or optical media, e.g., disk or CD/DVD-ROM coupled to computer system 1200 via I/O interface 1230. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, that implement the various methods and techniques as described herein, including the application of real-time low-complexity speech enhancement with spatial cue preservation, comprising various data accessible by program instructions 1225. In one embodiment, program instructions 1225 may include software elements of embodiments as described herein and as illustrated in the Figures. Data storage 1235 may include data that may be used in embodiments. In other embodiments, other or different software elements and data may be included.

Those skilled in the art will appreciate that computer system 1200 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a stereo speech enhancement system, the stereo speech enhancement system configured to:

receive, via an interface for the stereo speech enhancement system, a stereo input signal comprising a left input signal and a right input signal, wherein the left input signal comprises speech data corresponding to a target speaker and the right input signal comprises additional speech data corresponding to the target speaker;

estimate spatial cues for the target speaker;

downmix the stereo input signal to generate a monaural signal;

apply a machine learning model to the monaural signal to generate an enhanced monaural signal, wherein noise in the monaural signal is reduced or removed to generate the enhanced monaural signal;

upmix the enhanced monaural signal based at least on the estimated spatial cues for the target speaker to generate an enhanced stereo output signal, wherein the enhanced stereo output signal comprises a left output signal and a right output signal, wherein the left output signal comprises enhanced speech data corresponding to the target speaker and the right output signal comprises additional enhanced speech data corresponding to the target speaker; and send, via the interface of the stereo speech enhancement system, the enhanced stereo output signal to a destination.

2. The system of claim 1, wherein to downmix the stereo input signal, the stereo speech enhancement system is configured to:

apply beamforming to the stereo input signal.

3. The system of claim 1, wherein to upmix the enhanced monaural signal, the stereo speech enhancement system is configured to:

apply steering information of the target speaker to the enhanced monaural signal, wherein the steering information is based on the estimated spatial cues.

4. The system of claim 1, wherein the system further comprises audio sensors that capture the stereo input signal and wherein the destination is an audio-transmission service implemented as part of a provider network that transmits the enhanced stereo output signal to an audio playback device over a network connection.

5. The system of claim 1, wherein the stereo speech enhancement system is implemented as part of an audio-transmission service offered by a provider network, wherein the interface for the stereo speech enhancement system supports receiving the stereo input signal via a network connection, and wherein the destination is an audio playback device identified by the audio-transmission service for the enhanced stereo output signal.

6. A method, comprising:

receiving, via an interface for a stereo speech enhancement system, a multisource input signal comprising at least a first input signal and a second input signal;

estimating spatial cues for a target speaker represented in the multisource input signal;

downmixing the multisource input signal to generate a monaural signal;

applying a machine learning model to the monaural signal to generate an enhanced monaural signal, wherein noise in the monaural signal is reduced or removed to generate the enhanced monaural signal;

upmixing the enhanced monaural signal based at least on the estimated spatial cues for the target speaker to generate an enhanced multisource output signal comprising a first output signal and a second output signal; and providing, by the stereo speech enhancement system, the enhanced multisource output signal.

7. The method of claim 6, wherein downmixing the multisource input signal comprises:

applying beamforming to the multisource input signal.

8. The method of claim 7, wherein applying beamforming to the multisource input signal comprises:

applying delay-and-sum beamforming to the multisource input signal.

9. The method of claim 8, wherein estimating the spatial cues comprises estimating a steering vector of the target speaker, and further comprising:

applying the delay-and-sum beamforming using the estimated steering vector.

10. The method of claim 6, wherein upmixing the enhanced monaural signal comprises:

applying steering information of the target speaker to the enhanced monaural signal.

11. The method of claim 6, wherein the estimating spatial cues for the target speaker comprises:

estimating a steering vector of the target speaker using principal component analysis of an estimated spatial covariance matrix.

12. The method of claim 6, wherein the multisource input signal further comprises one or more additional input signals, and wherein the enhanced multisource output signal further comprises one or more additional outputs signals that respectively correspond to the one or more additional input signals.

13. The method of claim 6, wherein providing the enhanced multisource output signal comprises storing the enhanced multisource output signal to a data storage service offered by a provider network.

14. The method of claim 6, wherein the stereo speech enhancement system is implemented as part of a device that includes audio sensors that captured the multisource input signal, and wherein providing the enhanced multisource output signal comprises sending the enhanced multisource output signal to an audio-transmission service implemented as part of a provider network that transmits the enhanced multisource output signal to an audio playback device over a network connection.

15. One or more non-transitory, computer-readable storage media, storing program instructions that when executed on or across one or more computing devices cause the one or more computing devices to implement:

receiving, via an interface for a stereo speech enhancement system, a stereo input signal comprising a first input signal and a second input signal;

estimating spatial cues for a target speaker represented in the stereo input signal;

downmixing the stereo input signal to generate a monaural signal;

causing application of a machine learning model to the monaural signal to generate an enhanced monaural signal, wherein noise in the monaural signal is reduced or removed to generate the enhanced monaural signal;

upmixing the enhanced monaural signal based at least on the estimated spatial cues for the target speaker to generate an enhanced stereo output signal comprising a first output signal and a second output signal; and sending, by the stereo speech enhancement system, the enhanced stereo output signal to a destination.

16. The one or more non-transitory, computer-readable storage media of claim 15, wherein, in downmixing the stereo input signal to generate a monaural signal, the program instructions cause the one or more computing devices to implement:

applying beamforming to the stereo input signal.

17. The one or more non-transitory, computer-readable storage media of claim 15, wherein, in downmixing the stereo input signal to generate a monaural signal, the program instructions cause the one or more computing devices to implement:

applying delay-and-sum beamforming using the estimated spatial cues.

18. The one or more non-transitory, computer-readable storage media of claim 15, wherein, in upmixing the enhanced monaural signal, the program instructions cause the one or more computing devices to implement:

applying steering information of the target speaker to the enhanced monaural signal.

19. The one or more non-transitory, computer-readable storage media of claim 15, wherein the stereo speech enhancement system is implemented as part of a device that includes an audio sensor that captured the stereo input signal, and wherein sending the enhanced stereo output signal comprises sending the enhanced stereo output signal to an audio-transmission service implemented as part of a provider network that transmits the enhanced stereo output signal to an audio playback device over a network connection.

20. The one or more non-transitory, computer-readable storage media of claim 15, wherein the stereo input signal is captured along with corresponding video data that is provided to a same destination as the enhanced stereo output signal.

* * * * *